United States Patent [19]

Weigert

[11] 3,872,322

[45] Mar. 18, 1975

[54] DISCRIMINATOR CIRCUIT

[75] Inventor: Hans Weigert, Woodcliff Lake, N.J.

[73] Assignee: Ragen Semiconductor, Inc., Whippany, N.J.

[22] Filed: Jan. 30, 1974

[21] Appl. No.: 437,973

[52] U.S. Cl. .................. 307/231, 307/263, 307/268, 307/293

[51] Int. Cl. .................. H03k 5/20, H03k 17/26

[58] Field of Search .......... 307/231, 263, 268, 293; 328/55, 108, 114, 164

[56] References Cited

UNITED STATES PATENTS

| | | | |
|---|---|---|---|
| 3,007,060 | 10/1961 | Guenther | 307/268 |
| 3,132,259 | 5/1964 | Magleby | 307/268 |
| 3,327,230 | 6/1967 | Konian | 328/164 |
| 3,368,153 | 2/1968 | Garde | 307/268 |
| 3,555,306 | 1/1971 | Cogar et al. | 307/293 |
| 3,781,482 | 12/1973 | Wisotzky | 328/164 |

*Primary Examiner*—Stanley D. Miller, Jr.
*Attorney, Agent, or Firm*—Popper & Bobis

[57] ABSTRACT

A discriminator circuit for receiving an irregular waveform having false transitions at the beginning and end thereof, a generally regular portion intermediate said false transitions and typically followed by a spurious waveform after the end thereof, and for providing a regular waveform during only the time of said generally regular intermediate portion of said irregular waveform.

8 Claims, 1 Drawing Figure

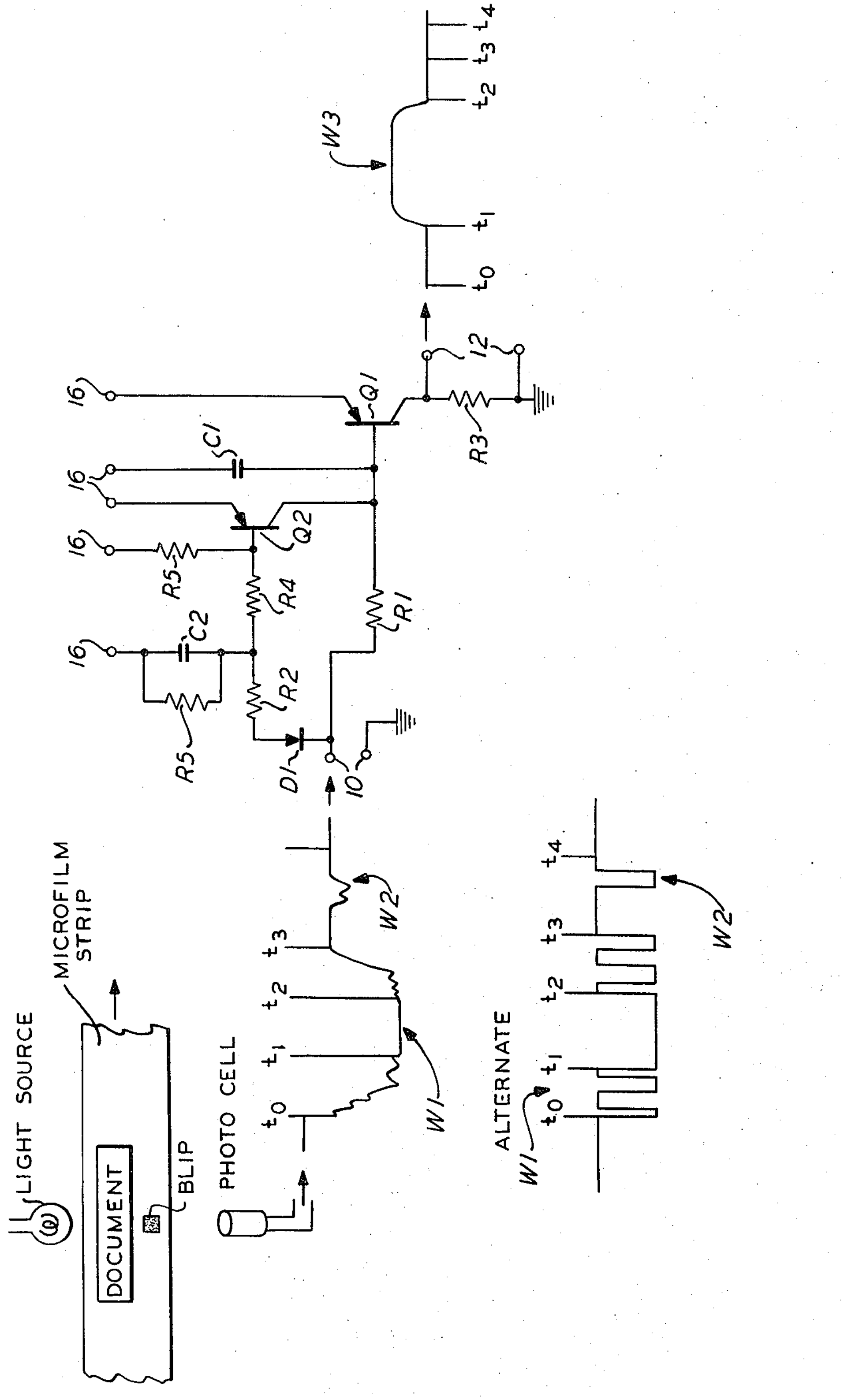
LIGHT SOURCE
MICROFILM STRIP
DOCUMENT
BLIP
PHOTO CELL
$t_0$ $t_1$ $t_2$ $t_3$
W1
W2
10
D1
R2
R5
C2
16
R4
R1
Q2
C1
Q1
R3
12
W3
$t_0$ $t_1$ $t_2$ $t_3$ $t_4$
ALTERNATE
W1
$t_0$ $t_1$ $t_2$ $t_3$ $t_4$
W2

DISCRIMINATOR CIRCUIT

BACKGROUND OF THE INVENTION

As is well known to those skilled in the waveform or electrical signal art, electrical signals produced in various circuitry may have false transitions at the beginning and ends thereof and may be followed by a spurious waveform after the end thereof. Such waveform or electrical signal conditions are undesirable for use by most electrical circuitry wherein it is much preferable that the waveform or electrical signal be a regular waveform or electrical signal, such as for example, a square wave.

The prior art is replete with various discriminator circuits for receiving an irregular waveform and for producing a regular waveform therefrom. However, the discriminator circuits of the prior art are typically undesirably or unwantedly complex and expensive, and accordingly, there exists a need in the waveform or electrical signal art for a discriminator circuit which is inexpensive and yet effective.

SUMMARY

The present invention satisfies the above-noted need in the waveform or electrical signal art by providing an effective yet inexpensive discriminator circuit for receiving an irregular waveform and providing a regular waveform in response to the receipt of said irregular waveform. A discriminator circuit according to the present invention may include first electrical switch means for connecting a suitable source of potential to the output of the discriminator circuit and first timing means responsive to the receipt of the irregular waveform and for not operating the first electrical switch means until after the elapse of a period of time during which the false transitions typically occur at the beginning of the irregular waveform. Such discriminator circuit electrical switch means connected to the first switch means and for controlling the operation of the first switch means, and the discriminator circuit according to the present invention may further include second timing means for operating the second electrical switch to turn off the first electrical switch means at the end of the generally regular intermediate portion of the irregular waveform and during the end portion of the irregular waveform during which time the false transitions typically occur and also during a period of time following the irregular waveform during which the above-noted spurious waveform may be present.

DESCRIPTION OF THE DRAWING

The drawing diagrammatically illustrates a situation wherein the above-noted irregular waveform may occur and schematically illustrates a discriminator circuit embodying the present invention.

DESCRIPTION OF THE INVENTION

Referring now to the leftward portion of the drawing, there is illustrated a situation wherein the above-noted irregular waveform may occur. More specifically, there is diagrammatically illustrated the reading or sensing of blips or document markers by a photocell whose output waveform or electrical signal may be the irregular waveform or electrical signal W1, the waveform W1 provided typically at the output of electrical circuitry (not shown) associated with the photocell; the blip or document marker typically being a dark square opaque to light and utilized to count, identify or retrieve the documents recorded on the microfilm strip in a manner known to those skilled in the microfilm recording and retrieval art.

The irregular waveform W1 as illustrated diagrammatically begins at time $t_0$ and has false transitions between the time $t_0$ and the time $t_1$ and between the time $t_2$ and the time $t_3$, and is typically provided with a generally smooth or regular intermediate portion between the time $t_1$ and the time $t_2$. Typically, as is also shown, a spurious waveform W2 follows the irregular waveform W1 and typically occurs not later than the time $t_4$; the spurious waveform W2 is apparently due to extraneous conditions such as shock or vibration.

The discriminator circuit shown in the drawing and embodying the present invention will receive the irregular waveform W1 at its input 10 and will provide in response thereto the regular waveform or electrical signal W3 at its output 12. More specifically, the discriminator circuit shown in the drawing and embodying the present invention may include first electrical switch means such as for example transistor Q1 connected to the output 12 and may further include a first timing circuit including resistor R1 and capacitor C1 electrically interconnected between the input 10 and the base of the transistor Q1. Further, the discriminator circuit shown in the drawing and embodying the present invention may include second electrical switch means, such as for example, transistor Q2 whose collector electrode may be connected to the base electrode of transistor Q1. Further, there may be included a second timing circuit including resistor R2, R4 and capacitor C2 electrically connected intermediate the input 10 and the base electrode of the second transistor Q2. A load resistor R3 may be electrically connected intermediate the collector electrode of transistor Q1 and the circuit common such as the ground connection shown. The emitter electrodes of the first and second transistors Q1 and Q2 and one side of the capacitors C1 and C2 may be connected to the supply source 16. Resistor R5 is used to dispel the residual charge on C2 remaining after time $t_4$, and may be connected in parallel with capacitor C2 or may be connected to the base of transistor Q2 as shown.

The time constant T1 of the first timing circuit including resistor R1 and capacitor C1 is less than the time constant T2 of the second timing circuit including resistor R2 and capacitor C2 for reasons which will become apparent from the following explanation, and it will be understood further from the following explanation the manner in which the respective time constants T1 and T2 are related to the time periods noted above with regard to the irregular waveform W1 and the occurrence of the spurious waveform W2.

In operation, the irregular waveform W1 or electrical signal will be applied to the input 10 of the discriminator circuit and hence will be applied in parallel to the first and second timing circuits. The first and second transistors Q1 and Q2 are normally off and the first time constant T1 is chosen such that the capacitor C1 will not store sufficient charge to apply a potential to the base of the first transistor Q1 sufficient to turn transistor Q1 on until the occurrence of time $t_1$, that is, until the elapse of the time between the occurrence of time $t_0$ and the occurrence of time $t_1$. Hence, as may be noted from the regular waveform W3 at the rightward portion of the drawing, during the elapse of the time between $t_0$ and $t_1$, no potential is provided by the transistor Q1 to the output 12 but upon the transistor Q1 being turned on at time $t_1$, the transistor Q1 supplies a substantially non-varying potential to the output 12, such potential being developed across the load resistor R3 which draws current from the supply source 16 upon the first transistor Q1 being turned on and which load resistor R3 will draw current from the supply source 16 so long as the transistor Q1 is turned on.

As noted above, the second time constant T2 of the second timing circuit including resistor R2 and capacitor C2 is chosen so as to be greater than the first time constant T1 and is chosen to be sufficiently long such that the capacitor C2 will not store sufficient charge to apply a potential to the base electrode of transistor Q2 until time $t_2$, that is, until the elapse of a period of time between the occurrence of time $t_0$ and the occurrence of $t_2$. Upon transistor Q2 being turned on, transistor Q2 applies a positive potential, drawn from supply source 16, to the base electrode of transistor Q1 sufficient to turn transistor Q1 off at time $t_2$ and it will be further understood that the time constant T3 (capacitor C2 and resistor R4) of the third timing circuit is sufficiently long such that the capacitor C2 retains a charge sufficient to maintain transistor Q2 on during the elapse of time between the time $t_2$ and the time $t_4$ whereby the transistor Q2 upon being maintained on will in turn maintain first transistor Q1 turned off during the period of time from time $t_2$ until time $t_4$.

Upon transistor Q1 being turned off by transistor Q2 the transistor Q1 will disconnect the load resistor R3 from the supply source 16 during the elapse of time between time $t_2$ and time $t_4$ and thus will not permit the load resistor to draw the above-noted current to develop the output potential across the load resistor at the discriminator circuit output 12.

Thus, it will be understood that the transistor Q1 is turned on at the time $t_1$ to provide a substantially non-varying potential at the output 12 and which potential is applied at the output 12 between the time $t_1$ and the time $t_2$, the presence of the substantially non-varying potential at the output 12 during such period of time providing the waveform W3 with the regular or smooth portion between the time $t_1$ and the time $t_2$ as shown in the drawing. It will be further understood that since the transistor Q1 is not turned on between the time $t_0$ and the time $t_1$ and between the time $t_2$ and the time $t_4$ that the false transitions occurring between the time $t_0$ and the time $t_1$ and between the time $t_2$ and the time $t_3$ will not be reflected in the output waveform W3 or will not be effective to cause the discriminator circuit to provide any output waveform or electrical signal during such periods of time, and also, that since the transistor Q1 is turned off between the time $t_3$ and the time $t_4$ during which time the spurious waveform W2 typically occurs, such spurious waveform will not cause the discriminator circuit of the present invention to respond by providing any output waveform W3 in response to or during the time that the spurious waveform W2 typically occurs.

It will be further understood by those skilled in the art that many variations and modifications may be made in the present invention without departing from the spirit and scope thereof.

What is claimed is:

1. A discriminator circuit for receiving an irregular waveform and for providing a regular waveform, said irregular waveform potentially having false transitions during a first predetermined period of time immediately following the beginning of said waveform, having a substantially regular portion during a second predetermined period of time immediately following said first predetermined period of time, and potentially having false transitions during a third predetermined period of time immediately following said second predetermined period of time and immediately preceding the end of said irregular waveform, and said irregular waveform potentially followed by a spurious waveform during a fourth predetermined period of time immediately following the end of said irregular waveform, comprising:

an input for receiving said irregular waveform;

an output for providing said regular waveform;

first electrical switch means electrically associated with said output and for being connected to a source of potential and said first electrical switch means having a first state and a second state and normally in said first state, upon said first electrical switch means being placed in said second state said first electrical switch means connecting said source of potential to said output and upon said first electrical switch means being placed in said second state said first electrical switch means disconnecting said source of potential from said output, the presence of said potential at said output providing said regular waveform;

a first timing circuit electrically associated with said input and said first electrical switch means and responsive to the receipt of said irregular waveform at said input to place said first electrical switch means in said first state at substantially the end of first said predetermined period whereby said potential is not provided at said output during said first predetermined period;

second electrical switch means electrically associated with said first electrical switch means and having a first state and a second state and normally in said first state, upon said second electrical switch being placed in said second state said second electrical switch returning said first electrical switch to said first state;

second timing means electrically associated with said input and said second electrical switch means and for placing said second electrical switch in said second state at substantially the beginning of said third period; and third timing means electrically associated with said second electrical switch means and for maintaining said second switch means in said second state during said third and said fourth predetermined periods whereby said potential is disconnected from said output during said third and fourth predetermined periods.

2. A discriminator circuit for receiving an irregular waveform and for providing a regular waveform, said irregular waveform: (i) beginning at time $t_0$, (ii) potentially having false transitions between time $t_0$ and time $t_1$ occurring a predetermined period after time $t_0$, (iii) having a substantially regular portion occurring between the time $t_1$ and the time $t_2$ occurring a predetermined period after time $t_1$, (iv) potentially having false transitions between the time $t_2$ and the time $t_3$ occurring a predetermined period after time $t_2$, and (v) potentially followed by a spurious waveform occurring not later than time $t_4$, time $t_4$ occurring a predetermined period after time $t_3$, comprising:

an input for receiving said irregular waveform;

an output for providing said regular waveform;

a first normally off transistor Q1 electrically associated with said output, upon said first transistor Q1 being turned on said first transistor Q1 applying a substantially non-varying potential at said output and upon said first transistor Q1 being turned off, said first transistor Q1 removing said substantially non-varying potential from said output, the presence of said substantially non-varying potential at said output providing said regular waveform;

a first timing circuit including resistor R1 and capacitor C1 electrically associated with said input and said first transistor Q1 and having a time constant T1 predetermined such that upon said irregular waveform being received at said input at time $t_0$ said capacitor C1 will have stored a charge sufficiently great at substantially time $t_1$ to apply a potential to said transistor Q1 sufficient to turn said transistor Q1 on at substantially time $t_1$;

a second normally off transistor Q2 electrically associated with first transistor Q1 and upon transistor Q2 being turned on said transistor Q2 applying a potential to transistor Q1 to turn transistor Q1 off;

a second timing circuit including resistor R2 and capacitor C2 electrically associated with said input and said transistor Q2, said second timing circuit having a time constant T2 predetermined such that upon said irregular waveform being received at said input at time $t_0$ said capacitor C2 will have stored a potential to transistor Q2 sufficient to turn transistor Q2 on at substantially time $t_2$; and a third timing circuit involving resistor R4 and capacitor C2 electrically associated with said transistor Q2 and having a time constant T3 predetermined such that capacitor C2 will store said charge sufficiently great to maintain transistor Q2 on until at least substantially time $t_4$ whereby transistor Q1 will be turned off during substantially the period of time $t_2$ until the time $t_4$.

3. A discriminator circuit according to claim 2 wherein said discriminator circuit is for being connected to a suitable supply potential and further includes a load resistor R3, wherein said transistor Q1 includes emitter, base and collector electrodes, wherein said emitter electrode is for being connected to said supply potential for providing said substantially non-varying potential, and wherein said load resistor R3 is connected between said collector electrode and said supply potential and wherein said output is provided across said load resistor R3.

4. A discriminator circuit according to claim 3 wherein said resistor R1 of said first timing circuit is connected in series between said input and said base electrode of transistor Q1 and wherein said capacitor C1 of said first timing circuit is connected between said base electrode of transistor Q1 and said supply potential.

5. A discriminator circuit according to claim 4 wherein said second transistor Q1 includes emitter, base and collector electrodes and wherein said emitter electrode is for being connected to said supply potential and wherein said collector electrode is connected to said base electrode of said first transistor Q1.

6. A discriminator circuit according to claim 5 wherein said resistor R2 of said second timing circuit is connected in series between said base electrode of said second transistor Q2 and said input, and wherein said capacitor C2 of said second timing circuit is connected between resistor R2 and said supply potential.

7. A discriminator circuit according to claim 6 wherein said third timing circuit includes said capacitor C2 and a resistor R4 connected between said capacitor C2 and said base of said transistor Q2.

8. A discriminator circuit according to claim 6 further including a blocking diode D1 connected in series between said input and said resistor R2 of said second timing circuit and said blocking diode D1 for preventing the change accumulated on said capacitor C2 from being dispelled by the applied waveform returning to its base potential, thus allowing said charge to maintain said transistor Q2 in the on state for the full period of time determined by a time constant T3 including said capacitor C2 and a resistor R4 connected between said capacitor C2 and the base of said transistor Q2.

* * * * *